US010384575B2

(12) United States Patent
Yu et al.

(10) Patent No.: US 10,384,575 B2
(45) Date of Patent: Aug. 20, 2019

(54) LUMBAR SPACER

(71) Applicant: GENTHERM AUTOMOTIVE SYSTEMS (CHINA) LTD., Langfan, Hebei (CN)

(72) Inventors: Tong (Eric) Yu, Hebei (CN); HaiMing (Steven) Yang, Hebei (CN)

(73) Assignee: GENTHERM AUTOMOTIVE SYSTEMS (CHINA) LTD., Langfang, Hebei (CN)

( * ) Notice: Subject to any disclaimer, the term of this patent is extended or adjusted under 35 U.S.C. 154(b) by 98 days.

(21) Appl. No.: 15/522,211

(22) PCT Filed: Oct. 28, 2014

(86) PCT No.: PCT/CN2014/089632
§ 371 (c)(1),
(2) Date: Apr. 26, 2017

(87) PCT Pub. No.: WO2016/065526
PCT Pub. Date: May 6, 2016

(65) Prior Publication Data
US 2017/0320416 A1 Nov. 9, 2017

(51) Int. Cl.
*B60N 2/60* (2006.01)
*B60N 2/66* (2006.01)
*B60N 2/56* (2006.01)

(52) U.S. Cl.
CPC ........... *B60N 2/667* (2015.04); *B60N 2/5642* (2013.01)

(58) Field of Classification Search
CPC .............................. B60N 2/667; B60N 2/5642

USPC ... 297/180.1, 180.13, 230.11, 452.42, 284.4, 297/452.15, 440.2, 180.14
See application file for complete search history.

(56) References Cited

U.S. PATENT DOCUMENTS

| | | | |
|---|---|---|---|
| 4,856,846 A * | 8/1989 | Lohmeyer | A47C 3/12 297/285 |
| 5,924,766 A | 7/1999 | Esaki et al. | |
| 7,322,643 B2 | 1/2008 | Ishima et al. | |
| 7,607,739 B2 * | 10/2009 | Browne | B60N 2/5621 297/180.1 |
| 7,857,395 B2 | 12/2010 | Kikuchi et al. | |
| 2004/0245811 A1 | 12/2004 | Bevan et al. | |

(Continued)

FOREIGN PATENT DOCUMENTS

| | | |
|---|---|---|
| CN | 1937937 A | 3/2007 |
| CN | 101406351 A | 4/2009 |

(Continued)

OTHER PUBLICATIONS

Notification of Reasons for Rejection for Japanese Application No. 2017-523480, dated Nov. 29, 2017.

(Continued)

*Primary Examiner* — Syed A Islam
(74) *Attorney, Agent, or Firm* — The Dobrusin Law Firm, P.C.

(57) ABSTRACT

A spacer (40) comprising a generally planar body portion (44) and one or more channels (42) defined by one or more unitary channel walls (48), channel wall segments (52), or both extending from the generally planar body portion (44); and one or more flexing regions (74) defined by two or more juxtaposed channel wall segments (52) separated by a gap (54) for providing flexibility to the spacer (40).

19 Claims, 7 Drawing Sheets

(56) References Cited

U.S. PATENT DOCUMENTS

| | | |
|---|---|---|
| 2005/0285438 A1 | 12/2005 | Ishima et al. |
| 2007/0257541 A1 | 11/2007 | Browne et al. |
| 2007/0262621 A1 | 11/2007 | Dong et al. |
| 2010/0102599 A1 | 4/2010 | Itou et al. |
| 2013/0113265 A1 | 5/2013 | Ota |
| 2015/0165946 A1 | 6/2015 | Taguchi |

FOREIGN PATENT DOCUMENTS

| | | |
|---|---|---|
| CN | 203126584 U | 8/2013 |
| JP | S54-148609 U | 12/1979 |
| JP | S61-55858 U | 4/1986 |
| JP | H10-297274 A | 11/1998 |
| JP | 2005-287538 A | 10/2005 |
| JP | 4863362 B2 | 1/2012 |
| JP | 2013-138716 A | 7/2013 |
| WO | 2014003143 A1 | 6/2016 |

OTHER PUBLICATIONS

International Search Report and Written Opinion for International Application No. PCT/CN2014/089632, dated Jul. 22, 2015.

\* cited by examiner

LUMBAR SPACER

FIELD

The present teachings relate to an air distribution and routing system, and more particularly to a ventilation and/or air routing system including a spacer for a vehicle seat that provides support and assists in directing air flow to a user.

BACKGROUND

For many years, industry has been concerned with designing improved ventilation and temperature control systems for articles of manufacture such as seats for automotive vehicles or other transportation vehicles. Temperature control within a vehicle is an important feature for a user, with users being able to control the direction and temperature of air conditioning and heat through a vehicle. Many seat assemblies also provide a user with the ability to control temperature of the seats. For example, in colder external temperatures, a user may desire to have the seat warmed. During warmer external temperatures, the user may desire a cooled seat, especially to cool the user's back and/or legs.

Air routing systems can provide ventilation and temperature control for vehicle seats. These systems may include one or more channels for directing air through a seat. Examples of such ventilation or air routing systems include U.S. Pat. Nos. 5,924,766; 7,322,643; 7,607,739; and U.S. Publication No. 2007/0262621, all of which are expressly incorporated by reference.

A challenge faced with air routing systems is that air channels may not have the ability to withstand the continued weight of a user over the lifetime of the seat assembly while maintaining some flexibility. Therefore, there is a need for greater flexibility of the channels while still supporting a user, resisting channel collapse, and providing temperature control over a large area of a seat. Some air routing systems also require many discrete parts, which may make manufacturing and installation more difficult. Therefore, there also is a need to ease the assembly and installation processes within a seat.

SUMMARY

The present teachings provide one or more solutions to the needs above by providing a device that provides support to a vehicle seat, increases flexibility, eases installation, simplifies manufacturing, or any combination thereof. Such characteristics are possible due to the features as disclosed herein.

The present teachings may include a spacer comprising a body portion, such as a generally planar body portion, and one or more channels defined by one or more unitary channel walls, channel wall segments, or both extending from the generally planar body portion. The spacer may include one or more flexing regions defined by two or more juxtaposed channel wall segments separated by a gap for providing flexibility to the spacer. The channel wall segments may form a plurality of rib structures extending from the body portion, each of the rib structures comprising two or more of the channel wall segments. One or more supports may be located between the two or more channel wall segments. The plurality of rib structures may be juxtaposed and separated by a gap for providing flexibility to the spacer.

The present teachings may include a seat assembly. The seat assembly may comprise any or a combination of a foam pad; a duct for directing an air supply to the foam pad; and a spacer. The spacer may include a body portion, such as a generally planar body portion, having a duct connection opening for receiving an end of the duct. The spacer may include one or more channels defined by one or more unitary channel walls, channel wall segments, or both, extending from the generally planar body portion. The spacer may include one or more flexing regions. The flexing regions may be defined by two or more of the channel wall segments juxtaposed and separated by a gap for providing flexibility to the spacer. The duct connection opening may be located within the one or more channels. The foam pad may include a plurality of openings in communication with the one or more channels of the spacer. The foam pad may include a recessed area on a B-side having generally the same shape as the channel defined by the one or more unitary channel walls, channel wall segments, or both for receiving at least a portion of the one or more unitary channel walls, channel wall segments, or both, so that air does not leak out between the gaps in the one or more flexing regions.

DETAILED DESCRIPTION

Figure 1:
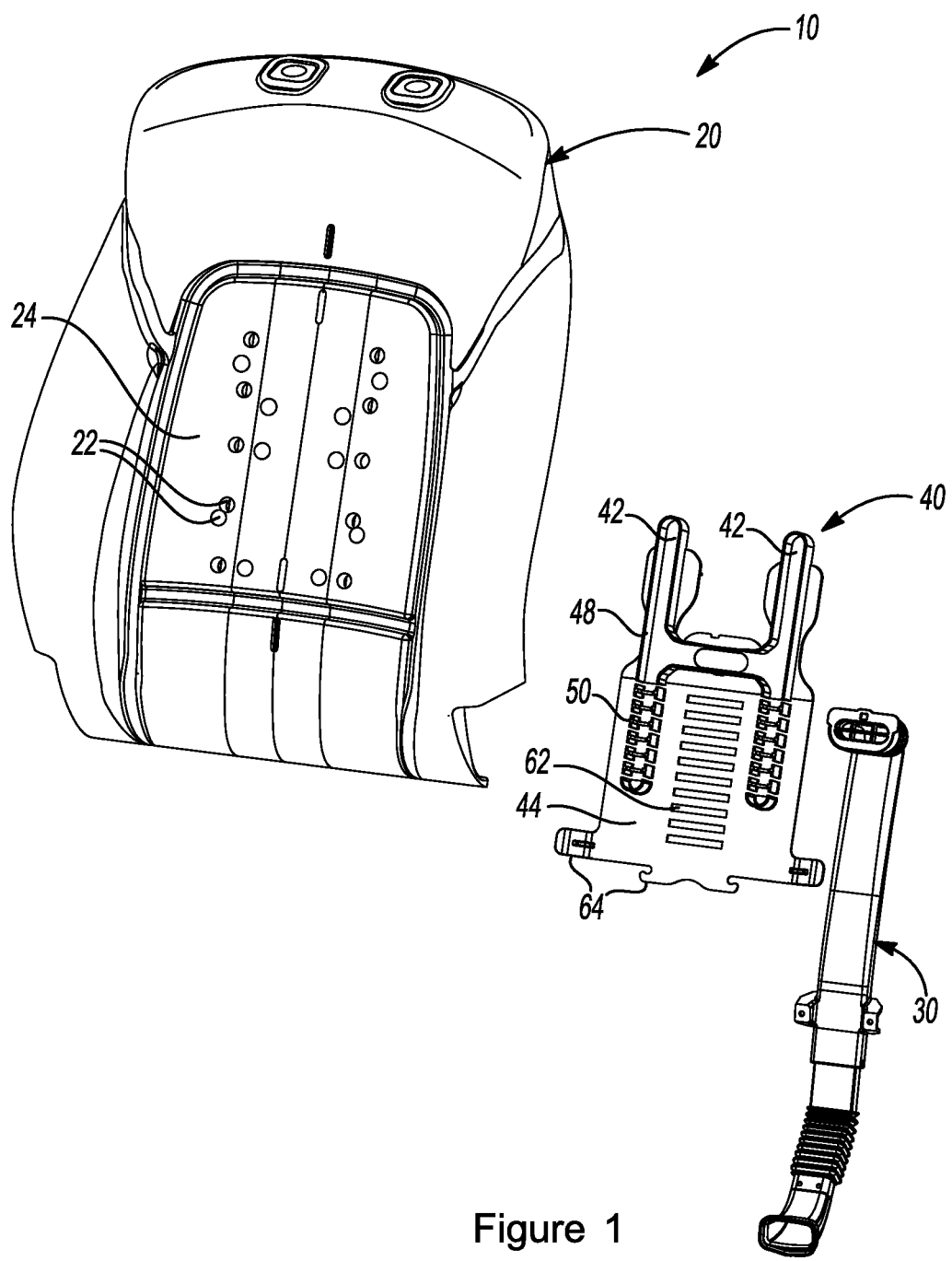
FIG. 1 illustrates an exploded front view of a partial seat assembly.

The explanations and illustrations presented herein are intended to acquaint others skilled in the art with the teachings, its principles, and its practical application. Those skilled in the art may adapt and apply the teachings in their numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing a spacer for allowing for air movement through a seat assembly to a user of a vehicle seat. The spacer may serve as an air guiding device. The air guiding device may include a spacer having one or more features as described herein. The air guiding device may act to guide air through a seat assembly. The air guiding device may guide air supplied by a source, such as a blower or air mover, from a duct opening to one or more channels. The air guiding device may direct air through the one or more channels and/or through one or more openings in the seat (e.g., in foam padding of the seat). The spacer and/or air guiding device may be used with almost any seat (e.g., a seat of a vehicle such as a car, truck, bus, train, airplane, office chair, or a combination thereof). The present teachings may be most suitable for use with a passenger vehicle (e.g., a car, truck, sport utility vehicle, or the like). Generally, a seat assembly of a vehicle includes a seat frame and one or more foam pads (i.e., a back and bun). A seat assembly may also include a duct for conveying or directing an air supply from a source (e.g., a blower) to a spacer, which then directs air to the user through the foam pad.

The seat assembly may include any element of the seat that allows a user, such as a passenger of a vehicle, to be seated thereon. The seat assembly may function to support a user in a vehicle. The seat assembly may permit customization to increase comfort to the user. Customizable features may include seat height, seat tilt, seat position (such as movement forward and backward (e.g., toward and away from the front of the vehicle) to customize legroom), angle of recline, temperature settings (e.g., provide heating, air conditioning, ventilation, or combination thereof), amount of support (such as lumbar support), ability to fold, ability to remove the seat or any of its components from the vehicle, the like, or combination thereof. These customizations may be actuated by one or more levers, buttons, motors, knobs, bars, the like, or combination thereof. The seat assembly may include a seat frame that functions to provide support and structure to the seat, protect other elements of the seat assembly, or both. The seat assembly may include a seat base for supporting a user's legs, a seat back for supporting the user's back (e.g., with lumbar support), one or more armrests, a head rest, the like, or combination thereof. The seat assembly may include an exterior covering (e.g., trim, upholstery). The covering may function to protect the foam padding and other elements of the assembly, provide decoration, provide a contact surface between the seat assembly and the user, provide additional comfort to the user, or combination thereof. The covering may be of any material, such as a fabric, cloth, polyester, wool, vinyl, leather, other material capable of providing covering the seat and withstanding the wear of a user sitting upon it, or any combination thereof. The covering may be air permeable, air impermeable, include holes to provide permeability, or a combination thereof. For example, the covering may be generally air impermeable but may include a plurality of openings or holes that allow fluid to be directed to the user.

The seat assembly includes foam padding or other cushioning material to provide comfort, cushioning, and support to the user; to protect the seat frame and other elements of the seat assembly; to permit air flow to the user; or combination thereof. The seat assembly may include one or more foam pads (e.g., a foam pad for supporting the user's legs and a separate foam pad for supporting the user's back). Each foam pad includes an A-side that faces toward the user, and a B-side that faces away from the user (e.g., toward the seat frame). The foam pad may have one or more cutouts, contours, through holes, recessed areas, or a combination thereof (for example, in the B-side) for receiving elements of the seat assembly (e.g., at least a portion of a spacer). Any or all of the foam pads of the seat assembly (e.g., at the B-side) may receive part of the seat frame, one or more securing articles, at least a portion of one or more air channels, at least a portion of a spacer, or any combination thereof. The foam pad may provide air flow and/or ventilation to the user via one or more or a plurality of openings in the foam pad. The openings in the foam pad may extend through the entire thickness of the pad (e.g., extending from the A-side to the B-side). The openings may be in communication with one or more air channels within the seat assembly (e.g., one or more channels of the spacer). The foam pad may assist in enclosing and/or sealing off the one or more channels of the spacer to reduce or prevent air from leaking out from between the gaps between the channel wall segments, from open areas of the channels (e.g., if the channel is defined by generally opposing vertical walls with no cap or cover), or both. The foam pad may assist in directing air only in desired areas (e.g., through the channel and the plurality of openings in the foam pad).

The seat assembly may include one or more blowers or other air movers to provide heating, cooling, and/or ventilation to a user via the seat. The one or more blowers may be an axial fan, a radial fan, or a combination of both. Preferably, the blower is a radial fan. The blower or air mover may provide air to the seat assembly through one or more ducts that guide air to the desired locations within the seat assembly (e.g., to a spacer for distributing air over an area of the seat). A duct may connect the one or more blowers or air movers to the spacer of the seat assembly. A blower and/or air mover may remove air from the assembly, such as removing warm air to cool a user or removing cold air to warm a user (i.e., provide suction to the assembly). The pulling side or pushing side may be connected to a duct of the assembly.

The spacer may function to create an open space within a foam pad. The spacer may function to create a path for a fluid to travel through a foam pad. The spacer may be partially and/or entirely extended into a foam pad. The spacer of the seat assembly may function to provide support to the foam pad, support to the user, support to one or more air channels, or combination thereof. The spacer may ease installation of the one or more channels into the seat assembly. The spacer may function to facilitate air distribution from a blower or air movement mechanism to a user. The spacer may include a body portion (such as one that is generally planar); one or more channels; one or more channel wall segments; one or more rib structures; one or more flexing regions defined by two or more juxtaposed channel wall segments, rib structures, or both separated by a gap for providing flexibility to the spacer; or a combination thereof. The spacer may be formed as a unitary piece. The spacer may include one or more discrete elements that are separately secured to the body portion. The spacer may be made of polymers or thermoplastics, such as polyformaldehyde (POM), or polyamides (PA). The spacer may be made of a single material, such as a metal or plastic. Elements of the spacer may be constructed of different materials (e.g., the channel walls may be constructed from a different material than the body portion).

The body portion may function to provide support and structure to the spacer. The body portion may support one or more channels. The body portion may serve as one or more boundaries of the channel (e.g., the segment of the body portion between two opposing channel walls). The body portion may form and serve as a contact surface for the foam pad when the seat assembly is assembled. The body portion may assist in forming a connection or seal between the foam pad and the spacer, which may reduce or prevent air leakage from the channels. The body portion may be rigid, flexible, or both. The body portion may withstand, accommodate, and/or support the weight of a user by flexing in at least a part of the body portion, remaining generally rigid in at least a part of the body portion, providing support to the channel walls to prevent channel collapse, or combination thereof. The body portion may have one or more flexible regions. The body portion may include one or more slits or cutouts for increasing flexibility to the spacer, reducing material and/or weight of the spacer, allowing the spacer to flex and/or move during installation within the seat assembly, or combination thereof. The body portion may be a generally planar body portion. The surface of the body portion may include one or more bends, contours, steps, angled segments, the like, or combination thereof. The one or more bends, contours, steps, angled segments, or a combination thereof may assist in installation and securing the body portion within the seat assembly. For example, a shape of the body portion may be complementary to at least a portion of the foam pad so that when installed, the body portion does not protrude from the foam pad. The body portion may include one or more cutouts for accommodating protruding parts of the seat assembly, reducing weight of the spacer, increasing flexibility of the body portion, or combination thereof. The body portion may be defined by one or more outer edges and may be any shape that would support one or more channels, ease the installation of the spacer, support a user of the seat, fit within the seat assembly, or any combination thereof. The body portion be a polygon shape. The body portion may be any non-geometric shape. The shape of the body portion may generally match the shape of the channel. For example, the body portion may be generally H-shaped for supporting a generally H-shaped channel. At least a portion of one or more channels may extend beyond an edge at a side of the body portion. At least a part of the body portion may extend past the boundary of the channel so that an edge of the body portion extends along one or more sides of the channel, two or more sides of the channel, three or more sides of the channel, or substantially surrounds at least a portion of the channel. The shape of the body portion may be different from the shape of the channel. For example, the body portion may be generally rectangular for supporting a generally U-shaped channel. The body portion may include one or more securing projections for securing the spacer within the seat assembly. The securing projections may include one or more tabs, fasteners, fingers, or combination thereof, which may contact or engage with other elements of the seat assembly (e.g., the seat frame, foam padding). The spacer may include additional fastening and/or securing elements, such as one or more clips or mechanical fasteners (such as fasteners located on a side of the body portion opposite the channels), so that the spacer may be secured within the seat assembly.

The spacer may include a duct connection opening that may be located within the one or more channels. The duct connection opening may function to allow a fluid to enter the spacer, the channels of the spacer, or both. The duct connection opening may function to create a seal so that fluid is transferred from the duct to the spacer, channels in the spacer, or both. The duct connection opening may be located at a top or bottom area of the channel (e.g., pumping air down or up toward the endpoints of the channel). The duct connection opening may be generally centrally located so that air is directed in multiple directions. For example, in an H-shaped channel, the duct connection opening may be located in the center and air may be directed to all four endpoints of the H. The duct connection opening may be any shape that allows an end of a duct to engage or connect with the channel to provide air flow to the channel. The duct connection opening may have a complementary shape to the duct (e.g., the cross section of the duct), may mirror the shape of the duct, or both. The duct connection opening may provide a seal between the duct and the channel. The seal may be formed or enhanced by friction fit, one or more gaskets, polymers, adhesives, lips, rings, fasteners, snaps, the like, or combination thereof.

The one or more channels of the spacer may function to receive fluid flow from one or more blowers or air movers, guide fluid flow to a user, or both. The one or more air movers may function to circulate air within a foam pad, within the spacer, or therebetween. The one or more channels may be an open space that fluid may extend through. The channels may be any shape that allows for air movement through the seat assembly over the area of the seat. For example, the channel may be generally shaped like the letter H, the letter U, or the letter I. The one or more channels may be defined by one or more unitary channel walls, channel wall segments, or both. Preferably, the one or more channels include a plurality of unitary channel walls, a plurality of channel wall segments, or both. The unitary channel walls, channel wall segments, or both, may be arranged to form a channel that has one or more linear portions, one or more curved portions, one or more shaped portions, or combination thereof. For example, the unitary channel walls and channel wall segments may be arranged to form a generally H-shaped channel including multiple generally linear portions formed by opposing unitary channel walls, juxtaposed channel wall segments (separated by a gap), or both. The unitary channel walls and/or channel wall segments may form a generally U-shaped channel, thereby having one or more linear portions and one or more angled or curved portions.

The unitary channel walls, channel wall segments, or both, may extend generally upward and/or away from the body portion of the spacer (e.g., generally perpendicular from the body portion, or in an angular relation with the body portion). A connecting wall may join two opposing walls or wall segments to serve as another surface for guiding air flow. At least a portion of the connecting wall may be generally positioned on or adhered to the body portion. At least a portion of the connecting wall may extend past an edge of the body portion (e.g., so that the portion of the connecting wall is not directly supported by the body portion). The body portion itself may define a portion of the channel (e.g., acting as the connecting wall). The unitary channel walls and/or channel wall segments may be formed as an indentation or recess in the body portion. The channel, or a portion of the channel, may be formed as an indentation or recess in the body portion (e.g., to increase the depth or alter the shape of the channel without having to increase the height of the unitary channel walls, unitary channel wall segments, or both). The endpoints of the one or more channels may be generally closed to define the channel and direct air through the foam pad to the user. The endpoints may include one or more closing walls or closing segments or ribs that may have a wall or wall segment that joins endpoints of opposing walls. The one or more unitary channel walls, channel wall segments, or both, may maintain a generally consistent height throughout the entire channel. The one or more unitary channel walls, channel wall segments, or both, may have varying height. The unitary channel walls, channel wall segments, or both may have a height of about 5 mm or more, about 10 mm or more, or about 15 mm or more. The unitary channel walls, channel wall segments, or both, may have a height of about 40 mm or less, about 30 mm or less, or about 25 mm or less. The depth of the channel at its deepest point may be about 5 mm or more, about 10 mm or more, or about 15 mm or more. The depth of the channel may be about 40 mm or less, about 30 mm or less, or about 25 mm or less. The width of the channel may be about 5 mm or more, about 10 mm or more, or about 15 mm or more. The width of the channel may be about 50 mm or less, about 40 mm or less, or about 30 mm or less.

The unitary channel walls, channel wall segments, or both, may have one or more faces (e.g., surfaces of the wall that face the channel, away from the channel, or both). The one or more faces may be generally flat. The one or more faces may have one or more curves. One or more terminal ends of the unitary channel walls, channel wall segments, or both, may taper inwardly relative to a base portion (located at or near the body portion of the spacer) as the walls and/or wall segments extend away from the base portion (so that the base is wider than the terminal end). The wider base may provide additional strength and stability to the channel, reduce tendency of the wall to collapse when the weight of a user is applied, or both. The faces of the unitary channel walls, channel wall segments, or both, may be generally parallel. The faces of the unitary channel walls, channel wall segments, or both may be angled toward each other. The walls (unitary channel walls, channel wall segments, or both) of the channels may be formed with a draft angle. The faces of the unitary channel walls, channel wall segments, or both, may be curved to provide a desired channel cross section shape. For example, the unitary channel walls and/or channel wall segments may form a channel cross section that is generally rectangular or generally rounded (with or without being completely or almost completely enclosed). The channels may be generally open on at least one side of the channel. For example, the channel of the spacer may include a generally planar body portion with two opposing unitary channel walls extending upwardly away from the generally planar portion without another wall or boundary completely enclosing the channel. The channel may have 3 walls and the walls may include an opening therebetween. Each of the unitary channel walls include a free end and a connected end. The free end of the unitary channel wall may be an upwardly-extending end. The upwardly-extending end may be free of connection with any other portion of the channel, the base plate, or both. The upwardly-extending ends of the unitary channel walls may be joined to enclose at least a portion of the channel, such as by forming a triangular or cylindrical cross section, for example. The channel may then have one or more openings to provide air flow to the plurality of openings in the foam pad. The channels may have a channel cover, cap, or the like, that generally closes the channel on all sides. The channel cover, cap, or the like may be a separate, discrete element. The channel cover, cap, or the like, may be integrally formed with the one or more unitary channel walls, channel wall segments, or both. The channel cover, cap, or the like, may include one or more openings in communication with one or more openings of the foam pad of the seat assembly to provide air flow to the user.

The one or more channel wall segments may function to provide flexibility to the spacer. The one or more channel wall segments may function to allow the spacer to function with movement of an occupant. The one or more channel wall segments may be compressible, movable relative to one or more adjacent channel wall segments, or both. The channel wall segments may be separated by a gap that may be positioned anywhere along the spacer where flexibility is desired. The channel wall segments may be juxtaposed (e.g., arranged or formed on the body portion in a generally linear arrangement) and separated by one or more gaps. The channel wall segments may be a portion of the channel wall that includes a gap separating two or more segments of the channel wall. The gaps may provide flexing regions for providing flexibility to the spacer. The gaps may be aligned (e.g., on opposing sides of the channel) so that the channel flexes generally evenly. The gaps may be selectively positioned to control the flexing regions of the spacer. For example, in a lumbar spacer, the channel wall segments may be generally located in the lower half of the spacer. The unitary channel walls may be one unitary piece, one contiguous piece, or both in the upper region of the spacer where less flexibility may be required (i.e., an upper half, an upper quarter). For example, a spacer located at the base portion of the seat assembly (the area supporting the user's legs), where much of the user's weight is placed, the entire channel may require flexibility so channel segments separated by gaps may define the entire channel. The channel wall segments may be separated by a gap of about 0.5 mm or more, about 1 mm or more, or about 2 mm or more. The channel wall segments may be separated by a gap of about 8 mm or less, about 6 mm or less, or about 5 mm or less. At an endpoint of a channel, a closing segment or rib may close the channel to control the air flow. A closing segment may include a generally U-shaped channel wall segment. The closing segment may be a generally curved channel wall segment, with the ends of the channel wall segment separated from adjacent channel wall segments (e.g., opposing channel wall segments) by the gap. The closing segment may include two or more channel wall segments (e.g., three channel wall segments with two generally parallel channel wall segments and one channel wall segment joining the two generally parallel channel wall segments). The closing segment may include a connecting wall connecting the channel wall segments for maintaining the shape of the closing segment.

The channels may be supported and strengthened by one or more supports. The supports may function to prevent the two opposing walls from be spread apart, moved together, or both. The supports may function maintain a constant distance between two opposing unitary channel walls, channel wall segments, or both. The supports may prevent the cantilever connection of the unitary channel walls, channel wall segments, or both, from being damaged. The supports may generally reside within the channel without inhibiting fluid flow. The supports may be used to affect or control the air flow within the channel. For example, a support located within the channel may assist in directing air upward toward an opening in the foam pad. The supports may provide additional strength, support, and/or structure to the unitary channel walls, channel wall segments, or both. For example, when a user sits in the seat and compresses the foam pad, due to the weight of the user, the supports may assist in retaining the shape of the channel so that the channel walls do not collapse. One or more supports may extend between each adjacent channel wall. A plurality of supports may extend between each channel wall. The supports may be positioned within the channel, between the one or more channel walls (e.g., at or near the inner face of the unitary channel wall or channel wall segment), or both. One or more supports may extend between and join two channel walls or channel wall segments. The one or more supports may form a U-shape within the one or more channels. One or more supports may be located at or near the outer face of the channel walls. The one or more supports may have a largest height, width, thickness, or a combination thereof proximate to the channels walls and gradually decrease in height, width, thickness, or a combination thereof as the supports extend away from the channel walls. The supports may be generally arcuate, generally linear, have a triangular shaped portion, be "C" shaped, "U" shaped, or combination thereof. The one or more supports may extend from the channel wall, channel wall segment, or both, in an angular relationship (e.g., extending from the wall and forming an angle of about 90 degrees between the support and the wall).

Opposing channel wall segments with one or more supports may form one or more rib structures. The one or more rib structures may each include two or more channel wall segments and one or more supports located between the two or more channel wall segments. For example, a support (or two supports, each support associated with one channel wall segment) may be located between two opposing channel wall segments and may contact each channel wall segment at any point (e.g., a generally central point) on the inner face of the channel wall segment. One or more supports may contact (and/or connect) the edges of the opposing channel wall segments. The rib structures may be formed as a unitary piece. The rib structures may be formed from two or more discrete pieces (e.g., a channel wall segment and connected support associated with an opposing channel wall segment and connected support).

The spacer may be installed within the seat assembly in the seat base, the seat back (e.g., as a lumbar spacer), or both. The spacer may be located at the B-side of the foam pad and situated between the seat frame and the foam pad. The B-side of the foam pad may include one or more cutouts or recessed areas that generally match or have a similar shape as the shape of the channel of the spacer. The cutouts or recessed areas may receive at least a portion of the unitary channel wall and/or channel wall segments. Therefore, boundaries of the channel when the seat is assembled may include two or more opposing unitary channel walls, a plurality of channel wall segments, a part of the body portion of the spacer, the foam pad (e.g., at one or more recessed areas or cutouts in the B-side), one or more closing segments, one or more connecting walls, or any combination thereof. Since at least a portion of the channels of the spacer may be generally open, the channel walls, channel wall segments, or both, inserted into the cutout or recessed area of the foam pad may act to enclose the channel. The foam pad may entirely receive the unitary channel walls, channel wall segments or both, which may seal, cover, or close the gaps of the channel to prevent or reduce air from leaking out between the gaps in the flexing regions. The foam pad may contact and/or be secured against the body portion of the spacer (e.g., at the of the body portion surrounding and/or encircling the channel walls) to further reduce or prevent air from leaking out between the gaps in the flexing regions.

At least a portion of the unitary channel walls, channel wall segments, or both, may be held and secured within the recessed area or cutouts of the B-side of the foam pad (e.g., by friction fit). The spacer may be held in place by an attachment between the foam pad and the seat frame. The spacer may be secured in place with one or more securing articles and/or the securing projections of the spacer body portion that attach the spacer to the foam pad, the seat frame, or both. The securing projections may include one or more tabs, fasteners, fingers, extensions, angled elements, or combination thereof, which may contact or engage with other elements of the seat assembly (e.g., the seat frame, foam padding). The securing articles may include any type of fastener, pin, member held by friction fit, clip, the like, or combination thereof. The spacer may be secured within the assembly by an adhesive (e.g., an adhesive joining the body portion and/or outer face of the channel walls (unitary channel wall, channel wall segments, or both) to the foam pad). The spacer may be secured within the assembly by one or more clips, nuts, bolts, tape, glue or other adhesive, or combination thereof to the seat frame, to the foam pad, or both. The duct for directing air from the blower or other air movement mechanism may be generally located within or near the seat frame and may be connected to the spacer at the duct connection opening. The plurality of openings in the foam pad that extend from the A-side of the foam pad to the B-side of the foam pad may be in communication with the one or more channels of the spacer (e.g., located generally in the area of the cutouts or recessed areas) so that air flowing through the channels may exit the channel through the openings.

Figure 2:
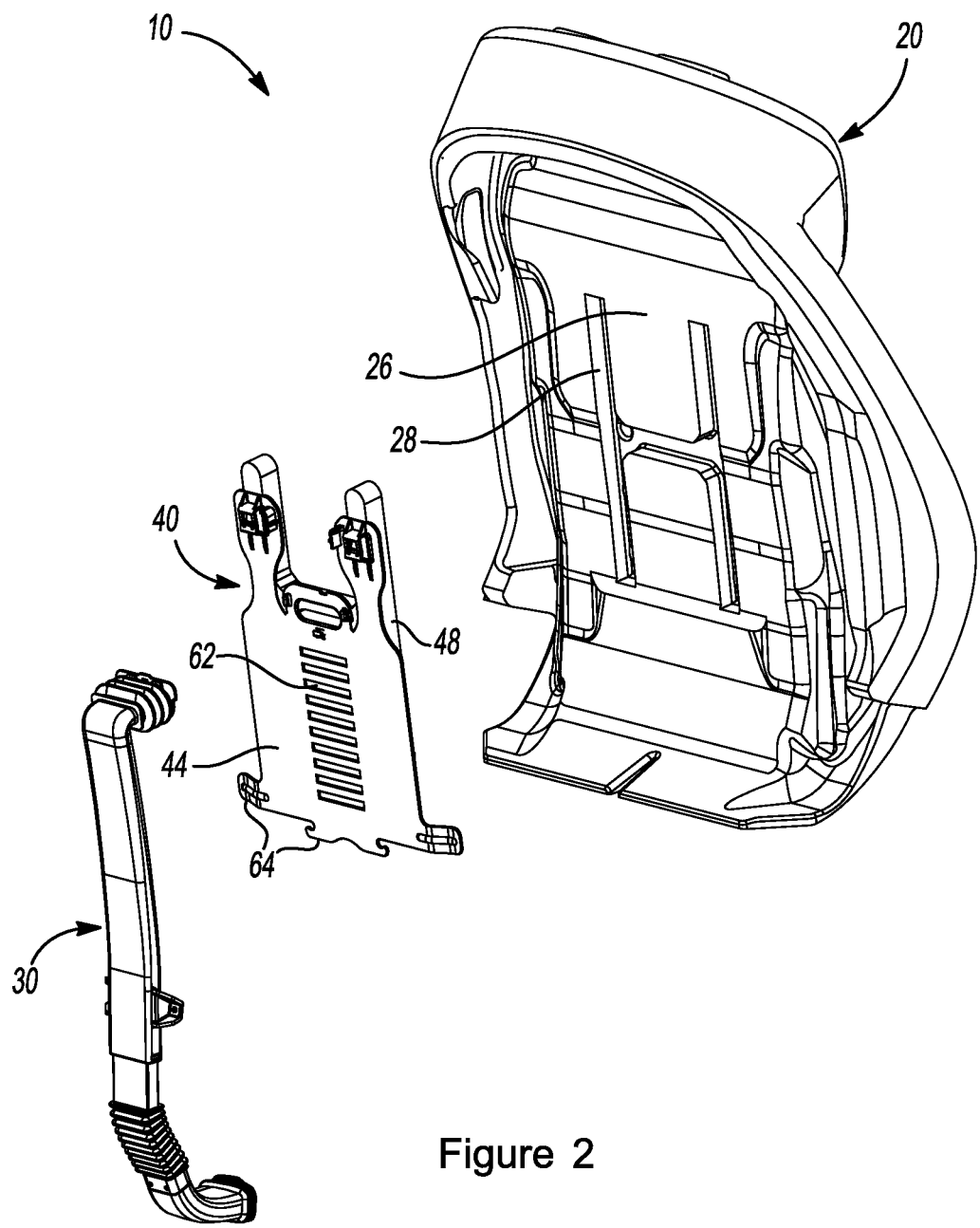
FIG. 2 illustrates an exploded rear view of a partial seat assembly of FIG. 1.

FIGS. 1 and 2 illustrate an exploded view of a seat assembly 10, such as for an automotive vehicle. The seat assembly 10 includes a foam pad 20 for cushioning and supporting a user's back, a seat frame 12 (see FIG. 5A), a duct 30, and a spacer 40 for directing air flow to provide ventilation and/or air flow for the seat assembly 10. Air is directed through the duct 30 to the spacer 40. The air then flows through the one or more channels 42 of the spacer 40 supported by a body portion 44 and through a plurality of openings 22 in the foam pad 20 from the B-side 26 to the A-side 24 for providing ventilation and/or air flow to a passenger occupying the seat. The spacer 40 includes a plurality of slits 62 in the body portion 44 for providing flexibility to the spacer and a plurality of securing projections 64 to secure the spacer 40 within the seat assembly 10. The B-side 26 of the foam pad 20, as shown in FIG. 2, includes a recessed area 28 generally matching the shape of the one or more channels 42 of the spacer 40, and the recessed area 28 receives at least a portion of channel walls 48 and a plurality of rib structures 50, which define the channel 42, during assembly.

Figure 3:
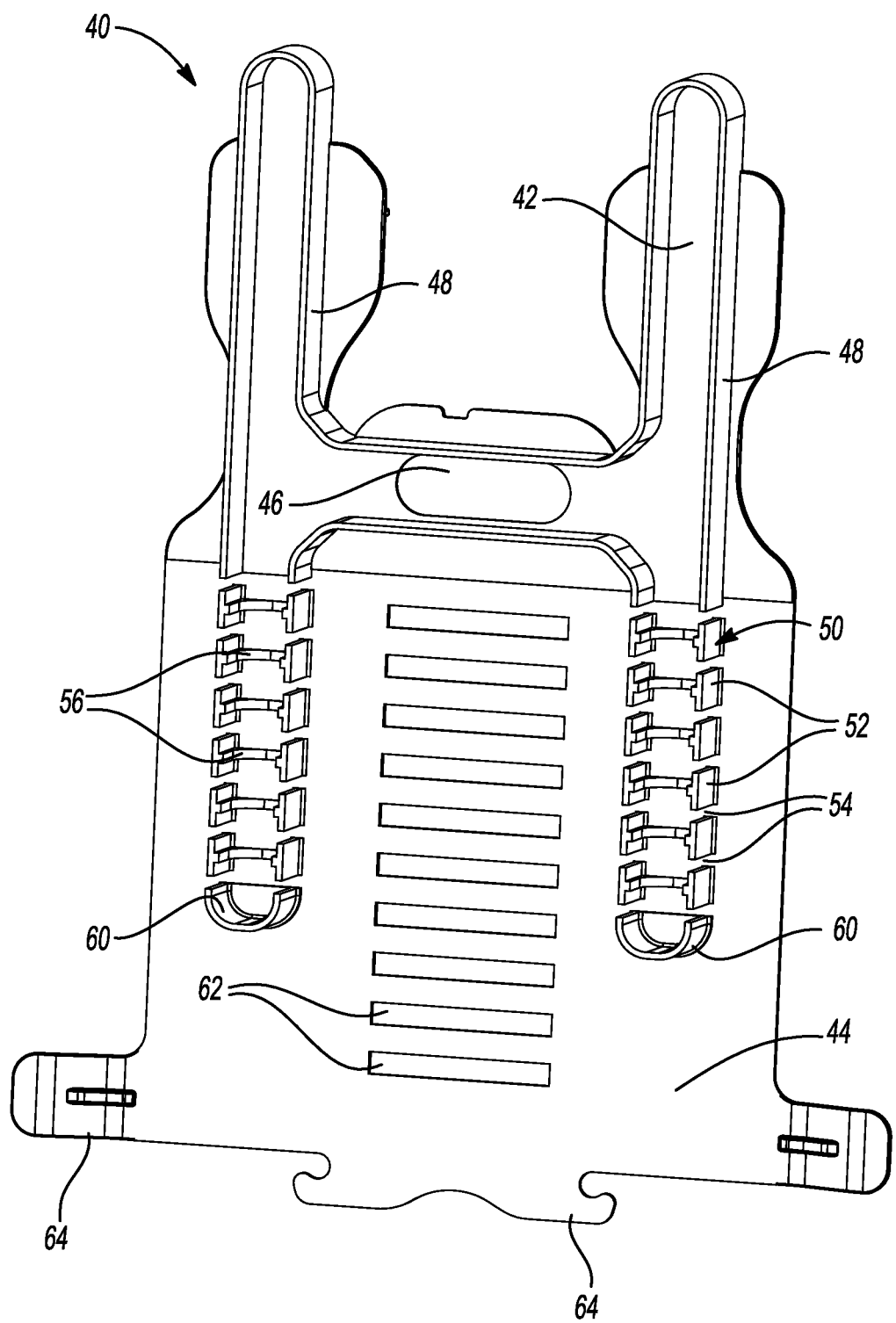
FIG. 3 illustrates a perspective view of a spacer.

FIG. 3 illustrates a spacer 40. The spacer 40 includes a body portion 44 that is generally planar and one or more channels 42 for receiving and directing air flow. The spacer employs a channel 42 that is generally H-shaped. The spacer includes a duct connection opening 46 for connecting with and/or receiving an end of the duct (see FIG. 1). The air flows from the duct and through the duct connection opening 46 into the channel 42 of the spacer 40. At least a portion of the channel 42 includes one or more channel walls 48. At least a portion of the channel 42 includes a plurality of channel wall segments 52 each separated by a gap 54. The channel wall segments 52 and one or more supports 56 form a plurality of discrete rib structures 50 juxtaposed and separated by a gap 54 for providing flexibility to the spacer 40. An end of the channel terminates at a closing segment 60. The spacer 40 includes one or more slits 62 in the body portion 44 for receiving elements of the seat frame and/or foam pad, for providing flexibility to the spacer, for providing material savings, or combination thereof. The body portion 44 includes a plurality of securing projections 64 for securing the spacer 40 within a seat assembly 10 (see FIGS. 1 and 2). The body portion 44 has a shape that supports the channels 42 of the spacer 40.

Figure 4:
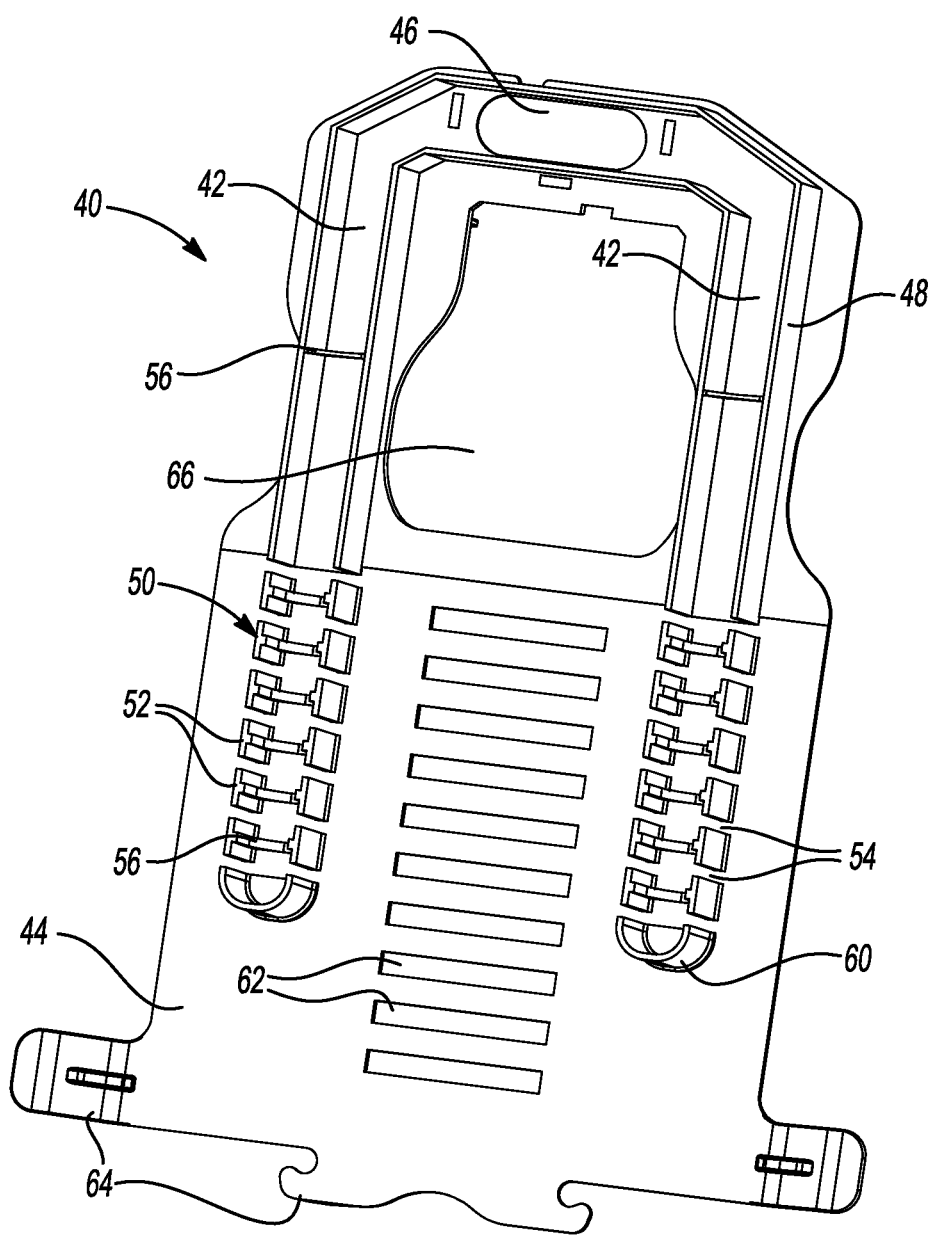
FIG. 4 illustrates a perspective view of a spacer.

FIG. 4 illustrates a spacer 40 including a generally planar body portion 44 and a channel 42 having a generally U-shape for receiving and directing air flow from the duct (not shown). The spacer 40 includes a duct connection opening 46, and air from the duct is directed through the channel 42. A portion of the channel 42 includes one or more channel walls 48, and one or more supports 56 are located within the channel 42. The channel 42 also includes a plurality of channel wall segments 52 separated by a gap 54 and one or more supports 56 forming a plurality of discrete rib structures 50. An end of the channel 42 terminates at a closing segment 60. The spacer 40 includes a plurality of slits 62 and a cutout 66 for providing flexibility and reducing material needed and one or more securing projections 64 for securing the spacer within a seat assembly.

Figure 5A:
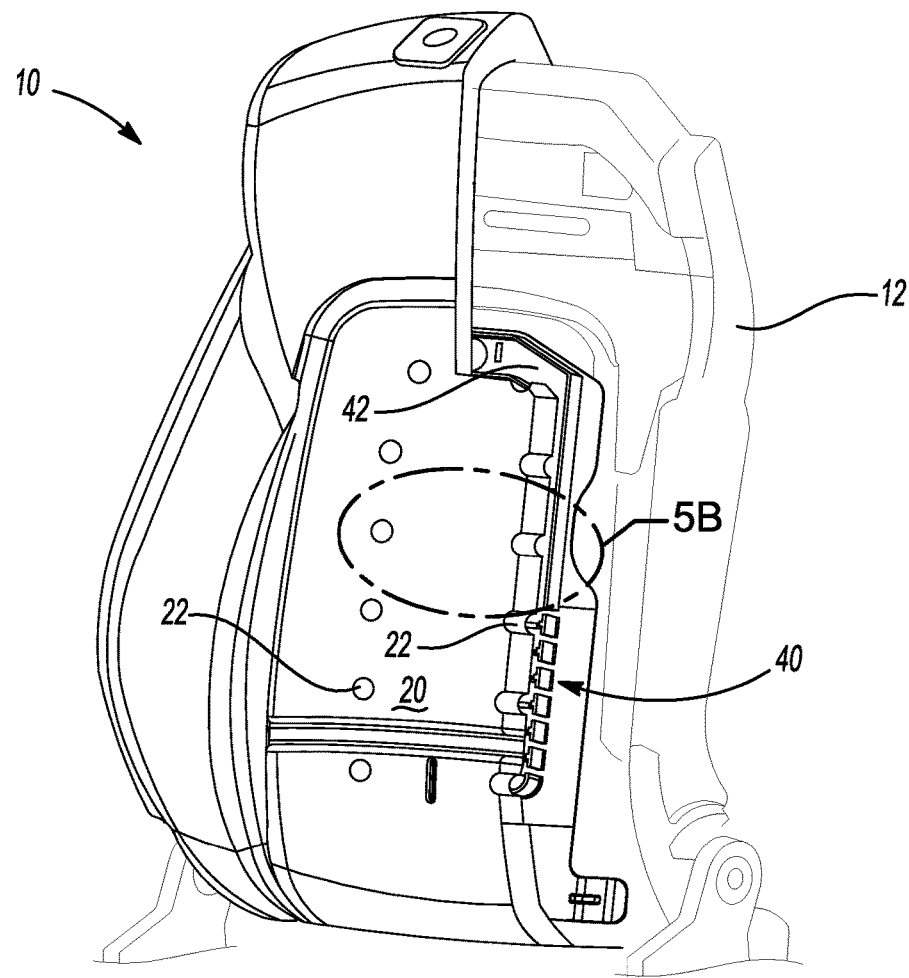
FIG. 5A illustrates a partial cutaway perspective view of a seat assembly.
Figure 5B:
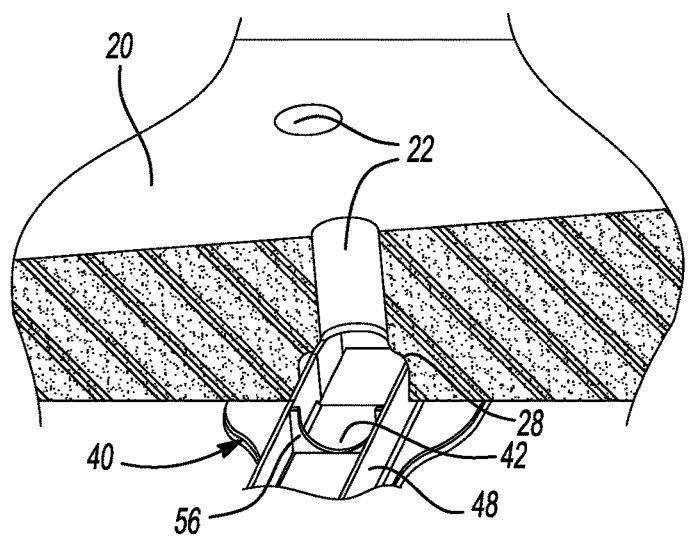
FIG. 5B illustrates an enlarged partial cutaway view of a foam pad and a channel of a spacer of FIG. 5A.

FIG. 5A illustrates a partial cutaway of a seat assembly 10, including a seat frame 12, a foam pad 20, and a spacer 40. The foam pad 20 includes a plurality of openings 22 in communication with a channel 42 of the spacer 40. FIG. 5B illustrates an enlarged partial cutaway view of the circled portion of FIG. 5A, including the foam pad 20 and an opening 22 through the entire thickness of the foam pad. The opening 22 is located above the channel 42 of the spacer 40, so that as air travels through the channel 42, the air can flow out of the opening 22. The channel walls 48 defining the channel 42 fit within the recessed area 28 of the foam pad 20 upon assembly. One or more supports 56 are also located within the channel 42.

Figure 6:
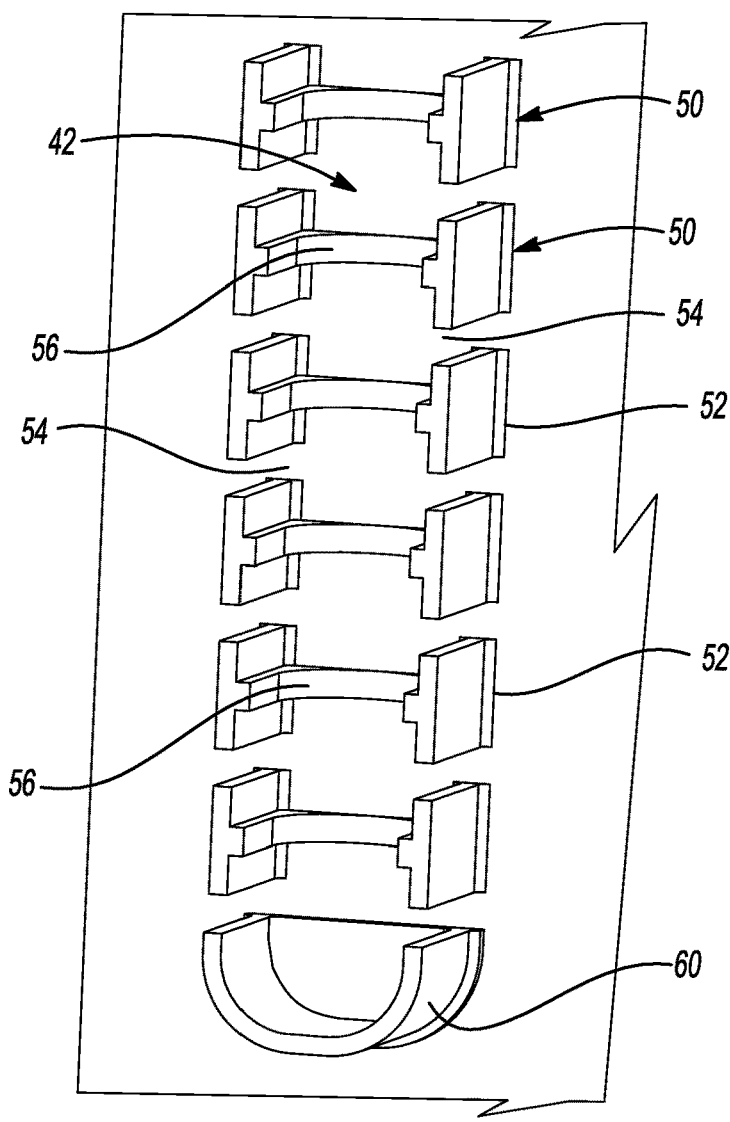
FIG. 6 illustrates an enlarged view of a plurality of rib structures of a spacer.

FIG. 6 illustrates an enlarged view of a portion of a channel 42 formed by a plurality of discrete rib structures 50 separated by a gap 54. Each rib structure 50 includes a channel wall segment 52 and one or more supports 56. The support 56 is a unitary support forming a generally U-shaped curve. Two or more supports 56 can be used to form each rib structure 50. The channel terminates at a closing segment 60.

Figure 7:
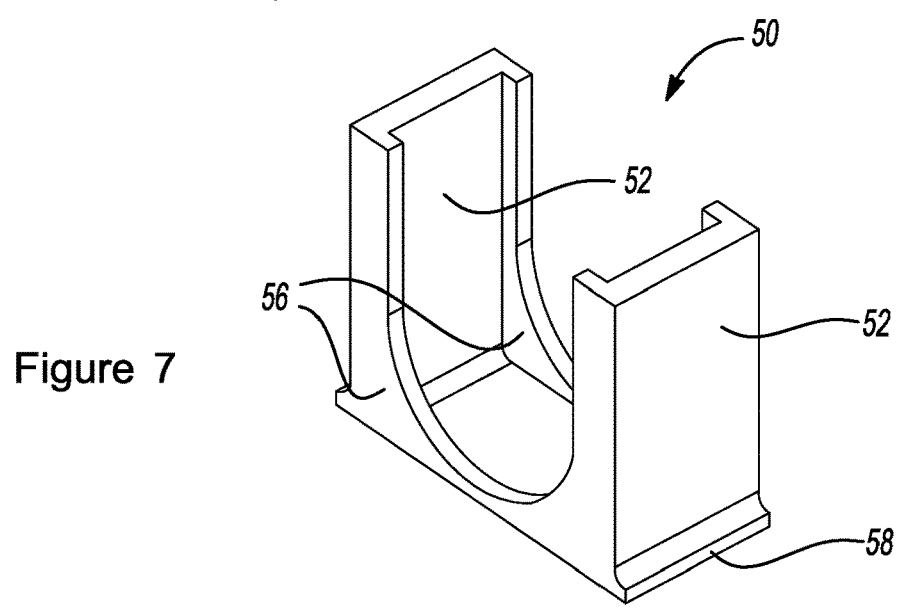
FIG. 7 illustrates a perspective view of a rib structure of a spacer.

FIG. 7 illustrates a rib structure 50. The rib structure 50 is a unitary piece including two opposing channel wall segments 52 and two opposing curved supports 56. The rib structure 50 includes a base 58 that has a larger dimension than any other portion of the rib structure.

Figure 8:
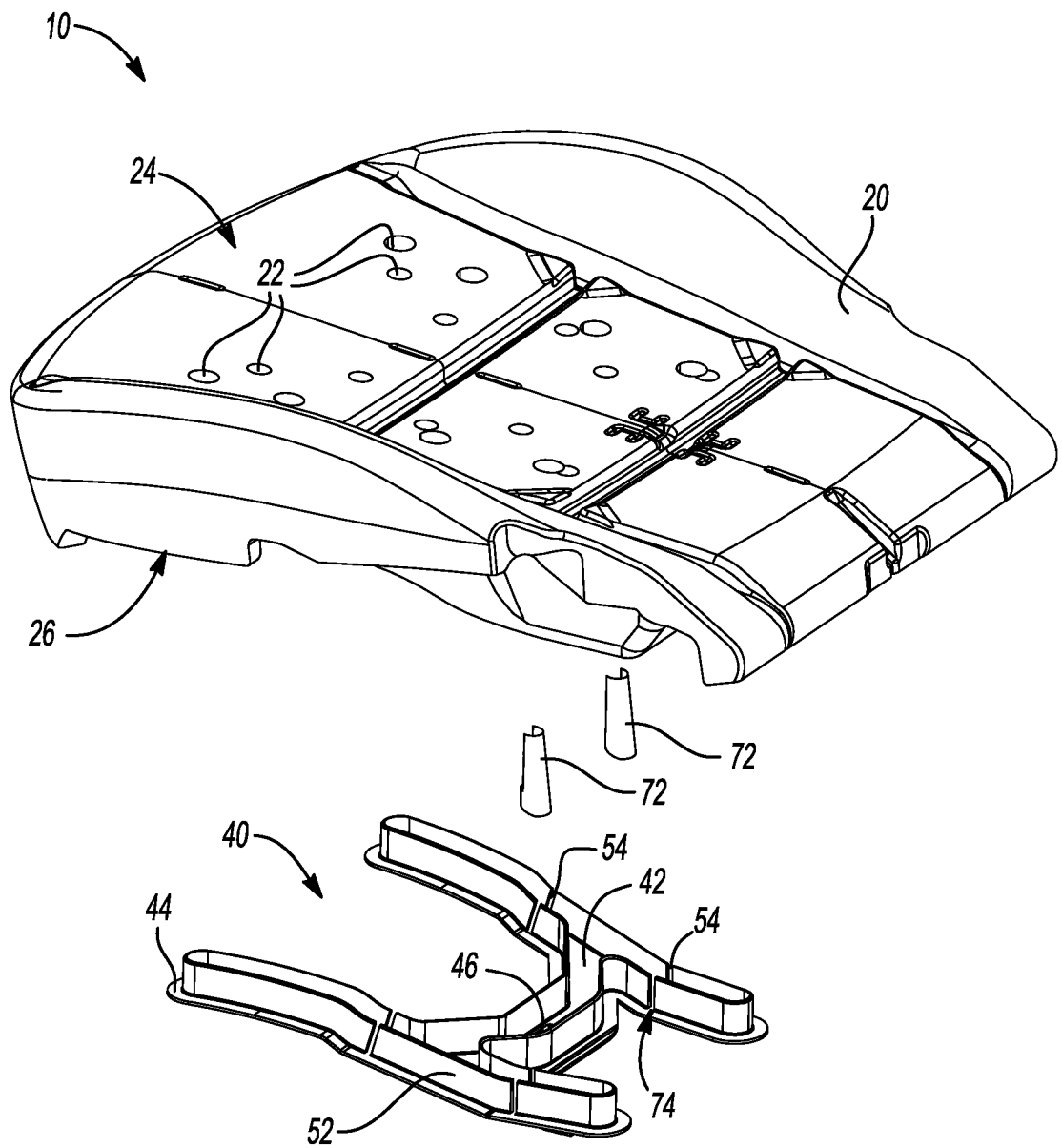
FIG. 8 illustrates an exploded view of a partial seat assembly.

FIG. 8 illustrates an exploded view of a seat assembly 10 including a foam pad 20 that supports a user's legs and a spacer 40. The spacer 40 includes a body portion 44 and a plurality of channel wall segments 52 separated by gaps 54 to form flexing regions 74 that allow for flexibility of the spacer 40. The spacer 40 includes a duct connection opening 46 for receiving a duct that supplies air to the channel 42 defined by the channel wall segments 52. The spacer 40 is installed on the B-side 26 of the foam pad 20 with securing articles 72. The foam pad 20 includes openings 22 in the foam pad that extend from the B-side 26 to the A-side 24 of the pad so that air can flow from the channel 42 to a user (e.g., a passenger sitting in the seat).

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A spacer comprising:
   a. a generally planar body portion; and
   b. one or more channels for directing airflow defined by one or more unitary channel walls, channel wall segments, or both extending from the generally planar body portion; and
   c. one or more flexing regions defined by two or more juxtaposed channel wall segments separated by a gap for providing flexibility to the spacer; wherein the spacer is for a vehicle seat, wherein the one or more channels are defined by the one or more unitary channel walls and a plurality of rib structures extending from the body portion, each of the rib structures comprising:
   a. two or more of the channel wall segments, and
   b. one or more supports located between the two or more channel wall segments; wherein the plurality of rib structures are juxtaposed and separated by a gap for providing flexibility to the spacer.

2. The spacer of claim 1, wherein the one or more supports form a U shape within the one or more channels.

3. The spacer of claim 1, wherein one or more of the plurality of rib structures are formed from a unitary piece.

4. The spacer of claim 1, wherein the one or more channels form an H shape.

5. The spacer of claim 1, wherein the one or more channels form a U shape.

6. The spacer of claim 1, wherein the body portion includes one or more slits for providing flexibility to the body portion.

7. The spacer of claim 1, wherein one or more supports are located between the one or more unitary channel walls.

8. The spacer of claim 1, wherein the spacer is formed from a unitary piece.

9. An air guiding device comprising the spacer of claim 1.

10. A seat assembly comprising:
 a. a foam pad;
 b. a duct for directing an air supply to the foam pad;
 c. a spacer including:
  i. a generally planar body portion having a duct connection opening for receiving an end of the duct;
  ii. one or more channels defined by one or more unitary channel walls, channel wall segments, or both extending from the generally planar body portion; and
  iii. one or more flexing regions defined by two or more of the channel wall segments juxtaposed and separated by a gap for providing flexibility to the spacer;
  wherein the duct connection opening is located within the one or more channels; and
 wherein the foam pad includes a plurality of openings in communication with the one or more channels of the spacer.

11. The seat assembly of claim 10, wherein the foam pad includes a recessed area on a B-side of the foam pad having generally the same shape as the channel defined by the one or more unitary channel walls, channel wall segments, or both for receiving at least a portion of the one or more unitary channel walls, channel wall segments, or both so that air does not leak out between the gap in the one or more flexing regions.

12. The seat assembly of claim 10, wherein the one or more channels are defined by the one or more unitary channel walls and a plurality of rib structures extending from the body portion, each of the rib structures comprising:
 a. two or more of the channel wall segments;
 b. one or more supports located between the two or more channel wall segments;
  wherein the plurality of rib structures are juxtaposed and separated by a gap for providing flexibility to the spacer.

13. The seat assembly of claim 12, wherein the one or more supports form a U-shape within the one or more channels.

14. The seat assembly of claim 12, wherein each of the plurality of rib structures are formed from a unitary piece.

15. The seat assembly of claim 10, wherein the spacer is formed from a unitary piece.

16. The spacer of claim 10, wherein the one or more channels form an H shape.

17. The spacer of claim 10, wherein the body portion includes one or more slits for providing flexibility to the body portion.

18. The spacer of claim 10, wherein the one or more channels form a U shape.

19. The seat assembly of claim 11, wherein the one or more channels are defined by the one or more unitary channel walls and a plurality of rib structures extending from the body portion, each of the rib structures comprising:
 a. two or more of the channel wall segments;
 b. one or more supports located between the two or more channel wall segments;
  wherein the plurality of rib structures are juxtaposed and separated by a gap for providing flexibility to the spacer.

\* \* \* \* \*